United States Patent
Liu et al.

(10) Patent No.: US 11,402,286 B2
(45) Date of Patent: Aug. 2, 2022

(54) METHOD AND SYSTEM FOR DETECTING HEALTH STATUS OF A BOLT THAT FASTENS A ROTOR BLADE OF A WIND TURBINE

(71) Applicant: Zhejiang Future Technology Institute (jiaxing), Jiaxing (CN)

(72) Inventors: Shuangwen Liu, Jiaxing (CN); Lei Liu, San Ramon, CA (US); Zhuang Li, Jiaxing (CN); Yunfeng Sheng, Jiaxing (CN); Jiajun Yao, Jiaxing (CN)

( * ) Notice: Subject to any disclaimer, the term of this patent is extended or adjusted under 35 U.S.C. 154(b) by 393 days.

(21) Appl. No.: 16/583,929

(22) Filed: Sep. 26, 2019

(65) Prior Publication Data

US 2021/0063261 A1    Mar. 4, 2021

(51) Int. Cl.
*G01L 5/24* (2006.01)
*F03D 17/00* (2016.01)

(52) U.S. Cl.
CPC .............. *G01L 5/24* (2013.01); *F03D 17/00* (2016.05); *F05B 2240/21* (2013.01); *F05B 2270/808* (2013.01)

(58) Field of Classification Search
CPC .......... G01L 5/24; F03D 17/00; F03D 1/0658; F05B 2240/21; F05B 2270/808; F05B 2260/301; F16B 31/04; F16B 31/06
See application file for complete search history.

(56) References Cited

U.S. PATENT DOCUMENTS

| | | | |
|---|---|---|---|
| 2012/0000158 A1* | 1/2012 | Laursen | F03D 13/20 52/651.01 |
| 2012/0134809 A1* | 5/2012 | Bagepalli | F03D 1/0658 416/1 |

* cited by examiner

*Primary Examiner* — Suman K Nath
(74) *Attorney, Agent, or Firm* — Jigang Jin

(57) ABSTRACT

The present invention discloses methods and systems for detecting the health status of a bolt which fastens a rotor blade of a wind turbine. Values of the axial stress/strain of the bolt and motion and orientation data are acquired in different aerial orientations. Values of the prestress/strain and load-stress/strain are obtained using the values of the axial stress/strain and the motion and orientation data. Values of the prestress/strain and load-stress/strain are compared with the reference values. The health status of the bolt, rotor blade, and the wind turbine system is determined based on the comparison results. The method is noninvasive and doesn't affect the function and performance of the bolt and the turbine system.

11 Claims, 3 Drawing Sheets

METHOD AND SYSTEM FOR DETECTING HEALTH STATUS OF A BOLT THAT FASTENS A ROTOR BLADE OF A WIND TURBINE

CROSS-REFERENCE TO RELATED APPLICATION

This application claims priority to Chinese Patent Application No. 201910722977.7 filed on Aug. 26, 2019, the entire content of which is incorporated by reference herein.

FIELD OF INVENTION

This invention generally relates to detecting the health status of a bolt which fastens a rotor blade of a wind turbine.

BACKGROUND OF THE INVENTION

Wind turbines are held together by bolts and nuts. The bolts and nuts not only fasten rotor blades but also provide power transmission. As rotor blades are always rotating and wind turbines are always shaking, bolts and nuts are under constant attack from vibration, fatigue, and relaxation forces. When bolts or nuts become loose, rotor blades and wind turbines may not work properly. Loose bolts and nuts may lead to joint separation and joint failure, causing a rotor blade to fall off the wind turbine tower or even collapse of the wind turbine tower. Thus, it is extremely important to detect the tightness and the health status of wind turbine bolts or nuts.

Currently, the tightness of wind turbine bolts or nuts is inspected manually in field inspections. The method is inefficient, very laborious, time consuming, and cannot detect a loose bolt or nut in time. The tightness state of a bolt or nut may also be monitored electronically. For instance, a strain gauge may be mounted on a bolt or nut. Then the bolt or nut may be inspected periodically or monitored online. But for a bolt or nut which fastens a rotating rotor blade, forces imposed on it change frequently. Thus, the strain data measured from the bolt or nut also changes frequently. It is difficult to extract useful reference data from strain measurements. Currently, some methods use a database based on a single kind of strain or stress data. According to such methods, strain or stress data collected from the object is compared with a preset threshold. However, these methods do not fit the wind turbine scenario, because the single kind of strain or stress can't be used to evaluate the health status of a bolt or nut which are constantly under multiple types of forces and these forces also change frequently. The current methods also fail to show how a force on a bolt or nut changes in detail and therefore fail to accurately measure the health status of the bolds and nuts as well as the blades.

Therefore, there exists a need for an improved system and method to inspect the tightness and health status of a bolt or nut for wind turbines.

SUMMARY OF THE INVENTION

The present invention discloses methods and systems for detecting the health status of a bolt which fastens a rotor blade of a wind turbine. The proposed methods and systems provide a better result than the current inspection method.

In one embodiment, the invention discloses a method which includes:

obtaining values of axial stress/strain and motion and orientation data of a bolt that fastens a rotor blade of a wind turbine under different motions and orientations;

determining values of prestress/strain and load-stress/strain based on the values of the axial stress/strain and the motion and orientation data; and comparing the values of prestress/strain and load-stress/strain with reference values obtained when the bolt is at a normal condition and determining the health status of the bolt based on the comparison results.

In addition, the axial stress/strain equals the prestress/strain plus the load-stress/strain. The load-stress/strain includes first load-stress/strain caused by the gravity of the blade and second load-stress/strain caused by the centrifugal force of the blade.

When the wind turbine is in normal (i.e., healthy) working condition, values of the axial stress/strain and motion and orientation data of the bolt are collected in different aerial orientations. Then reference values of the prestress/strain and load-stress/strain values are determined. The motion and orientation data includes orientation angle and angular velocity. A reference value of the prestress/strain may be calculated by using values of the axial stress/strain and a low-pass filter or an average method. The reference value of the prestress/strain may be called the first DC component.

Values of the axial stress/strain at an orientation angle may be processed through a low-pass filter or averaging to get the second DC component. The first load-stress/strain at the orientation angle is calculated by deducting the prestress/strain from the second DC component.

Values of first load-stress/strain are obtained at different orientation angles using values of the axial stress/strain. A curve of the first load-stress/strain versus orientation angle may be constructed by a curve fitting method.

A value of the second load-stress/strain at an orientation angle is calculated by deducting values of the prestress/strain and the first load-stress/strain at the orientation angle from the value of the axial stress/strain at the orientation angle. Values of the second load-stress/strain at different orientation angles may be obtained using the method. A curve of the second load-stress/strain versus angular velocity may be constructed using angular velocity and values of the second load-stress/strain.

The load-stress/strain is calculated by deducting the prestress/strain from the axial stress/strain.

In an inspection, the first load-stress/strain at an orientation angle may be obtained using the orientation angle and the curve of the first load-stress/strain versus orientation angle. The second load-stress/strain at an angular velocity may be obtained using the angular velocity and the curve of the second load-stress/strain versus angular velocity. The prestress/strain of the bolt is calculated by deducting the first load-stress/strain and the second load-stress/strain from the axial stress/strain. Then, whether the bolt is loose or in fatigue may be determined by comparing the value of the prestress/strain with the reference value of the prestress/strain.

Additionally, the strain of the bolt may be measured by ultrasonic reflection techniques, strain gauges, or fiber-optic methods which detect the extended length of the bolt. The screwed-out angle of the bolt or a nut which pairs with the bolt may be measured and used to determine whether the bolt is loose. Ultrasonic detection may be conducted to ascertain whether the bolt is broken.

Then, whether the bolt is in fatigue may be determined based on the tightness of the bolt or nut, whether the bolt is broken, and/or whether the value of the prestress/strain is in a normal range.

The health status of the rotor blade may be determined by comparing a value of the load-stress/strain with the reference value.

Moreover, the method further includes determining the health status of a wind turbine system based on the health status of multiple rotor blades and the health status of multiple bolts which fasten the blades.

In another embodiment, the invention discloses a system for detecting the health status of a bolt which fastens a rotor blade of a wind turbine. The system includes:

a detection module for acquiring values of the axial stress/strain of the bolt and motion and orientation data in different aerial orientations;

a stress/strain analysis module for obtaining the prestress/strain and load-stress/strain of the bolt using the values of the axial stress/strain and the motion and orientation data; and a determination module for determining the health status of the bolt based on comparison results between values of the prestress/strain and load-stress/strain and the reference values.

The present invention discloses methods and systems to detect the health status of a bolt which fastens a rotor blade of a wind turbine. The prestress and load-stress of the bolt are calculated accurately. The health status of the bolt, rotor blade, and wind turbine may be determined by comparing measurement results with the reference values. The detection method is noninvasive and doesn't affect the function and performance of the bolt and the system. The detection system has merits such as high practicality, low cost, high efficiency, a simple calculation process, low computational cost, and a broad range of applications.

BRIEF DESCRIPTION OF THE DRAWINGS

The subject matter, which is regarded as the invention, is particularly pointed out and distinctly claimed in the claims at the conclusion of the specification. The foregoing and other features and also the advantages of the invention will be apparent from the following detailed description taken in conjunction with the accompanying drawings. Additionally, the leftmost digit of a reference number identifies the drawing in which the reference number first appears.

DETAILED DESCRIPTION

Detailed description of the present invention is provided below along with figures and embodiments, which further clarifies the objectives, technical solutions, and advantages of the present invention. It is noted that schematic embodiments discussed herein are merely for illustrating the invention. The present invention is not limited to the embodiments disclosed.

Figure 1:
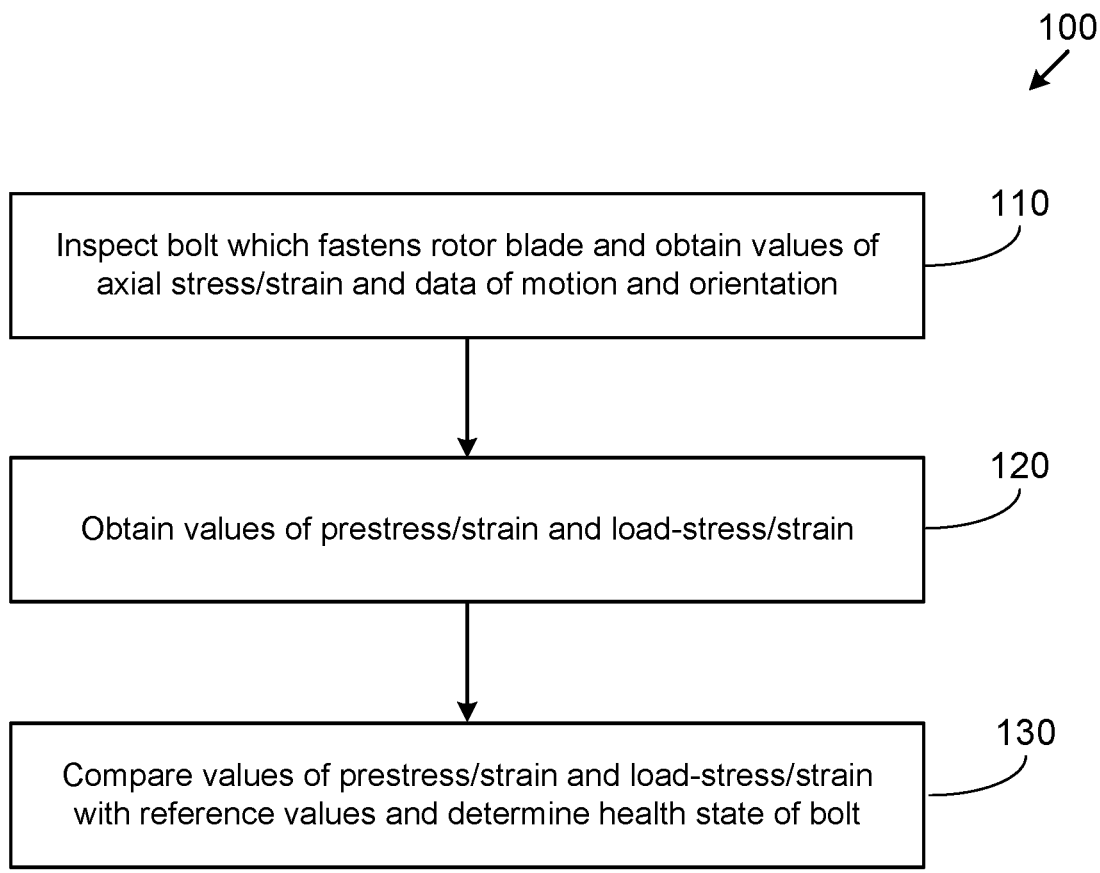
FIG. 1 is a flow diagram that illustrates an exemplary process of detecting the health status of a bolt, according to one embodiment of the present invention.

FIG. 1 is a flow diagram which illustrates an exemplary process 100 for detecting the health status of a bolt, according to one embodiment of the present invention. The bolt is used to fasten a rotor blade of a wind turbine. In step 110, the axial stress/strain of the bolt is measured in different aerial orientations and motion and orientation data is also obtained. In step 120, values of prestress/strain and load-stress/strain are calculated using values of the axial stress/strain and the motion and orientation data. Then in step 130, the values of the prestress/strain and load-stress/strain are compared with reference values. The health status of the bolt is determined by the comparison results.

Figure 2:
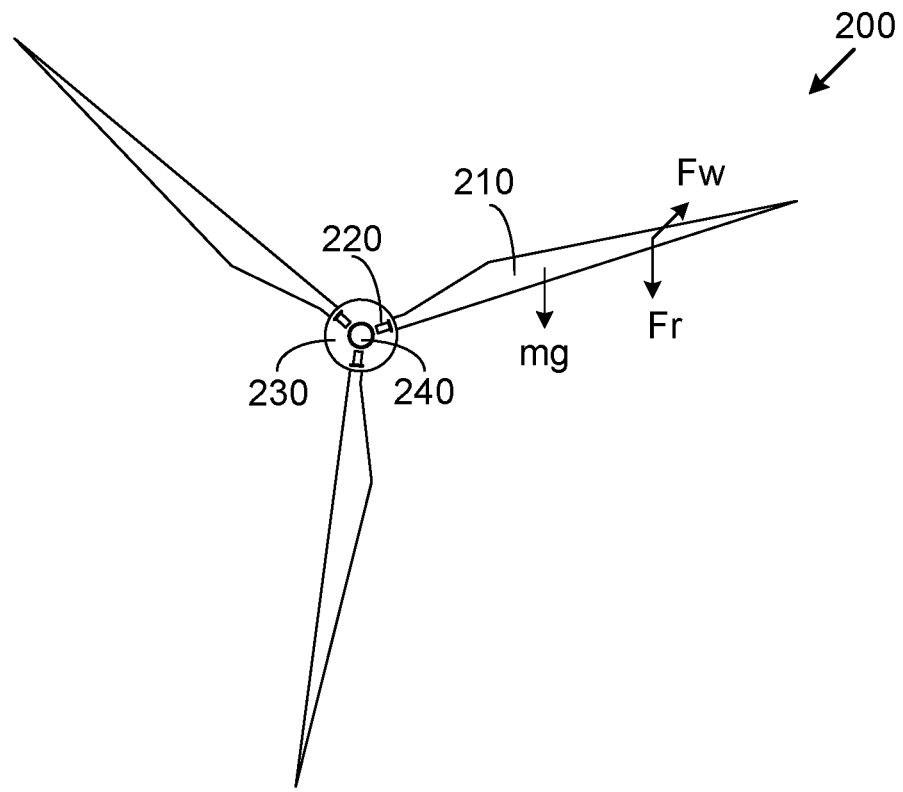
FIG. 2 shows an exemplary diagram of an assembly containing bolts and rotor blades, according to one embodiment of the present invention.

FIG. 2 illustrates an exemplary assembly 200 of a wind turbine, according to one embodiment of the present invention. There are three rotor blades fixed on a hub 230. A blade 210 is fastened by a bolt 220, the axial direction of the bolt 220 is in the length direction of the blade 210. Hub 230 is connected to a shaft 240 that spins along with the rotation of the blades. The forces applied to blade 210 include the gravity mg, the force of wind Fw, and the driving force Fr. As aforementioned, the axial stress/strain of bolt 220 equals the addition of the prestress/strain and the load-stress/strain. As used herein, the prestress is the stress when there is no load applied and the load-stress is the stress when there is a load applied to bolt 220. The load-stress/strain includes the first load-stress/strain caused by the gravity of blade 210 and the second load-stress/strain caused by the centrifugal force of blade 210. The axial stress, prestress, and load-stress satisfy the following equations.

$$\sigma = \sigma_0 + \sigma_l(\theta, m, r, \omega) \tag{1}$$

$$\sigma_l(\theta, \omega, m, r) = \sigma_l(\theta, m) + \sigma_l(m, r, \omega) \tag{2}$$

For the bolt, $\sigma$ is the axial stress of the bolt, $\sigma_0$ is the prestress, $\sigma_l(\theta, m, r, \omega)$ is the load-stress, $\sigma_l(\theta, m)$ is the first load-stress caused by the gravity of the rotor blade, and $\theta_l(m, r, \omega)$ is the second load-stress caused by the centrifugal force of the blade. In the equations, $\theta$ is the orientation angle, m is the mass of the blade, r is the distance between the center of gravity of the blade and the rotating shaft, and $\omega$ is the angular velocity of the blade. It is noted that blade mass m and distance r are constants, while orientation angle $\theta$ is a variable which changes periodically and angular velocity $\omega$ is a variable too. Prestress $\sigma_0$ is a constant. Then, equations 1 and 2 may be changed to:

$$\sigma = \sigma_0 + \sigma_l(\theta, \omega) \tag{3}$$

$$\sigma_l(\theta, \omega) = \sigma_l(\theta) + \sigma_l(\omega) \tag{4}$$

As the axial strain $\varepsilon$ of the bolt may be measured by a strain gauge, ultrasonic methods, or fiber-optic methods, the axial stress $\sigma$ may be calculated via equation $\sigma = E\varepsilon$ (Hooke's law) (5), where E is the elastic modulus of the bolt.

The motion and orientation data may include gravitational acceleration, linear acceleration, velocity, displacement, angular acceleration, angular velocity, angle, direction of the geomagnetic field, pitch angle, yaw angle, and/or roll angle. The data may be acquired by one or more accelerometers, gyroscopes, and/or magnetic field sensors.

The orientation angle is in a plane of rotation where the bolt rotates along with the rotation of the blade. The orientation angle is an angle between a line linking the center of gravity of the bolt and the shaft and a component of the gravity in the plane of rotation. A reference orientation angle for all bolts may be defined by a orientation angle of a orientation sensor. The orientation sensor is mounted on one of the blades or the hub. Then the actual orientation angle of a bolt may be calculated using the reference orientation angle and orientations of the bolt and the orientation sensor.

Alternatively, the orientation angle of a bolt may be measured using a orientation sensor mounted on the bolt. As the bolt may rotate in a loosening process, the actual orientation angle equals the measured orientation angle minus the angle the bolt rotates by itself.

When the wind turbine system is in normal working condition, values of the axial stress/strain and motion and orientation data of a bolt in different aerial orientations are obtained. Then, values of prestress/strain and load-stress/strain are calculated by using the values of axial stress/strain of the bolt and the motion and orientation data. The values of prestress/strain and load-stress/strain are the reference values.

During the initial operating period of the wind turbine, assuming that the wear and tear on the bolts, nuts, rotor blades, and wind turbine is negligible, components of the wind turbine system may be considered in normal condition. Values of the axial stress/strain of a bolt and motion and orientation data may be acquired. Values of the prestress/strain, the first load-stress/strain, and the second load-stress/strain may be calculated and considered as the reference values. The reference values may be used to ascertain the health status of the bolt in an inspection. The motion and orientation data includes orientation angles and angular velocity.

For explanation purpose, exemplary steps of a process to get the reference values are described below.

Let's assume that a wind turbine is in normal working condition. In step A, the process acquires values of the axial stress/strain of a bolt and motion and orientation data. The process then determines the first DC component via a low-pass filter or an averaging method. The first DC component is the prestress/strain of the bolt.

In step B, the process uses values of the axial stress/strain at a orientation angle to obtain the second DC component via a low-pass filter or an averaging method. Through the above described equations (3) and (4), the process calculates the first load-stress/strain at the orientation angle by deducting the prestress/strain obtained in step A from the second DC component.

In step C, the process uses values of the axial stress/strain at different orientation angles to obtain values of the first load-stress/strain at the orientation angles and constructs a curve of the first load-stress/strain versus orientation angle via a curve fitting method.

In step D, based on the above equations (3) and (4), the process calculates the second load-stress/strain at different orientation angles. The second load-stress/strain at a orientation angle is calculated by deducting the prestress/strain and the first load-stress/strain at the angle from the axial stress/strain at the angle. The process then constructs a curve of the second load-stress/strain versus angular velocity via a curve fitting method.

In step E, based on equation (3), the process calculates the load-stress/strain of the bolt by deducting the prestress/strain from the axial stress/strain. Values of the prestress/strain and load-stress/strain are of reference values.

Steps A-E are arranged for getting the reference values. Exemplary steps to inspect a bolt in a detection process include:

detecting the axial stress/strain of the bolt and a orientation angle and obtaining a value of the first load-stress/strain using the orientation angle and the curve of the first load-stress/strain versus orientation angle;

detecting angular velocity and obtaining a value of the second load-stress/strain using the angular velocity and the curve of the second load-stress/strain versus angular velocity; calculating the prestress/strain of the bolt by deducting the first and second load-stress/strain from the axial stress/strain; and comparing the value of the prestress/strain with the reference value which is obtained when the working condition is normal; and determining whether the bolt is loose or in fatigue based on the comparison results. If the value of the prestress/strain is smaller than the reference value, it may be considered that the bolt is loose or in fatigue. As discussed above, the reference value of the prestress/strain may be obtained when the wind turbine is in normal working condition. Alternatively, the reference value of the prestress/strain may also be predetermined and treated as a known value in certain applications.

Additionally, multiple values of the prestress/strain may be calculated at multiple orientation angles. Then, an average value of the prestress/strain may be obtained. The health status may be determined based on comparison between the average value and the reference value.

In addition, the screwed-out angle of the bolt or a nut which pairs with the bolt may be detected. The tightness of the bolt or nut may be determined based on the screwed-out angle. The bolt may also be inspected using ultrasonic methods. For instance, whether the bolt is broken may be determined by ultrasonic techniques.

Thus, whether the bolt is in fatigue may be determined based on the tightness of the bolt or nut, information about whether the bolt is broken, and comparison results between the value of prestress/strain and the reference value.

The strain of the bolt may be detected by ultrasonic reflection methods, strain gauges, and/or fiber-optic methods.

Take an ultrasonic method for example. After an ultrasonic signal is coupled into the bolt through one end of the bolt, the signal travels along the bolt and a portion of the signal is reflected by the other end of the bolt. Then, the flight time of the reflected signal may be measured. If there is a crack, the flight time will be longer. Increase of the flight time caused by a crack is much larger than increase caused by the strain of the bolt. Thus, whether the bolt is broken may be determined.

Therefore, detection of the health status of the bolt may include the follows steps: (1) detecting whether the bolt has cracks; (2) detecting whether the bolt becomes loose by checking the screwed-out angle; and (3) if there is no crack and the bolt is not loose, detecting whether the bolt is in fatigue. If the value of the prestress/strain is smaller than the reference value, the bolt is in fatigue.

In an inspection process, whether the blade is broken is determined by comparing values of the first load-stress/strain with the reference values. Whether the blade is in fatigue is determined by comparing values of the second load-stress/strain with the reference values. Since a blade in fatigue needs different wind force to achieve the same rotation force to drive the blade when compared with a blade in normal condition at the same angular velocity, values of the second load-stress/strain may be used to determine whether the blade is in fatigue.

The health status of a wind turbine system may be determined based on the health status of multiple rotor blades and multiple bolts which fasten the blades. For instance, the bolts may be inspected in different aerial orientations. For each bolt, values of the load-stress/strain may be calculated at different orientation angles. After comparing values of the load-stress/strain with the reference values, the health status of the bolts and blades may be ascertained respectively. When an abnormal result is detected, the health status of the wind turbine system is determined by comparing the abnormal result to features of health status collected in the past. Health issues of the system may include blade fatigue, broken blade, abnormal operating state of a group of wind turbines. In cases where there are no records of health status features, information about the abnormal state is stored for use in the future.

Therefore, the health status of the bolts, rotor blades, and turbine system may be detected. The method is non-destructive and doesn't affect the function and performance of the bolts and the system.

Figure 3:
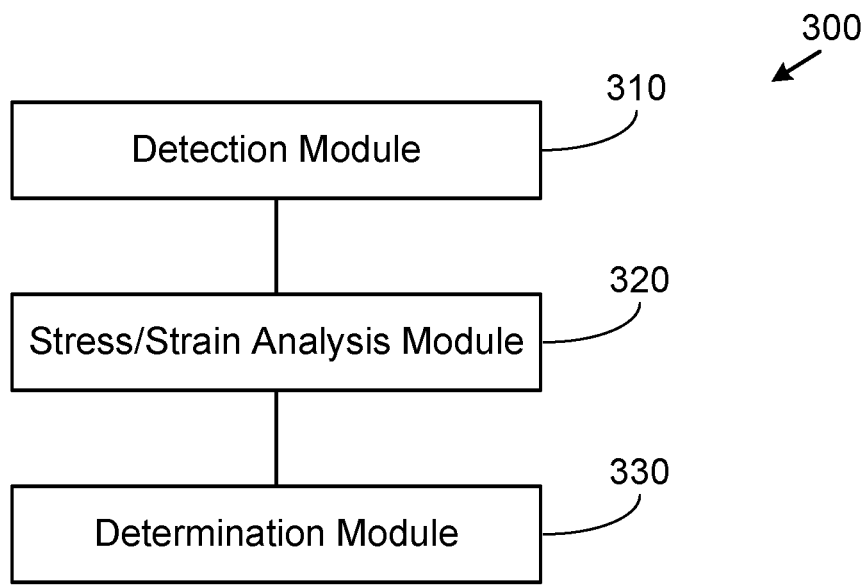
FIG. 3 shows an exemplary diagram of a system for detecting the health status of a bolt, according to one embodiment of the present invention.

FIG. 3 shows an exemplary detection system 300 for determining the health status of a bolt, according to one embodiment of the present invention. Assuming that a bolt is used to mount a rotor blade on a hub of a wind turbine, system 300 includes a detection module 310. Module 310 detects the axial stress/strain and collects motion and orientation data in different aerial orientations. Module 310 may include a measuring device to measure the axial strain of the bolt. The measuring device may be attached to an end surface of the bolt. It may be a strain gauge, an ultrasonic sensor, or a fiber-optic sensor. A time-of-flight method may be used to detect whether the bolt is broken, when the ultrasonic sensor is used.

Module 310 may include one or more microelectromechanical systems (MEMS) sensors for acquiring the motion and orientation data. The MEMS sensors may include an accelerometer, a magnetic field sensor, and/or a gyroscope.

The motion and orientation data may include gravitational acceleration, linear acceleration, velocity, displacement, angular acceleration, angular velocity, angle, direction of the geomagnetic field, pitch angle, yaw angle, and/or roll angle.

The orientation angle is in a plane of rotation where the bolt rotates along with the rotation of the blade. The orientation angle is an angle between a line linking the center of gravity of the bolt and the shaft and a component of the gravity in the plane of rotation. The orientation angle may be measured by methods described below.

One method obtains a reference orientation angle for the bolt by measuring a orientation angle of an orientation sensor. The orientation sensor is mounted on the blade or the hub. The method then calculates the actual orientation angle of the bolt by using the reference orientation angle and orientations of the bolt and the orientation sensor.

Alternatively, the orientation angle of the bolt may be measured using a orientation sensor mounted on the bolt. As the bolt may rotates in a loosening process, the actual orientation angle equals the measured orientation angle minus the angle the bolt rotates by itself.

System 300 also includes a stress/strain analysis module 320 and a determination module 330. Module 320 is used to calculate the prestress/strain and load-stress/strain of the bolt using values of the axial stress/strain and motion and orientation data. In applications, module 320 may be a local or remote system. If the module is at a place away from the wind turbine, it may receive data wirelessly or via a landline and process the data to get measurement results. Module 330 compares values of the prestress/strain and load-stress/strain with the reference values and determines the health status of the bolt based on the comparison results.

Optionally, system 300 may include an alert module (not shown). The alert module may send out alert signals when module 330 detects any abnormal condition. For instance, the alert module may transmit an alert message to a server when it is determined that the bolt, rotor blade, or wind turbine is in abnormal state.

Figure 4:
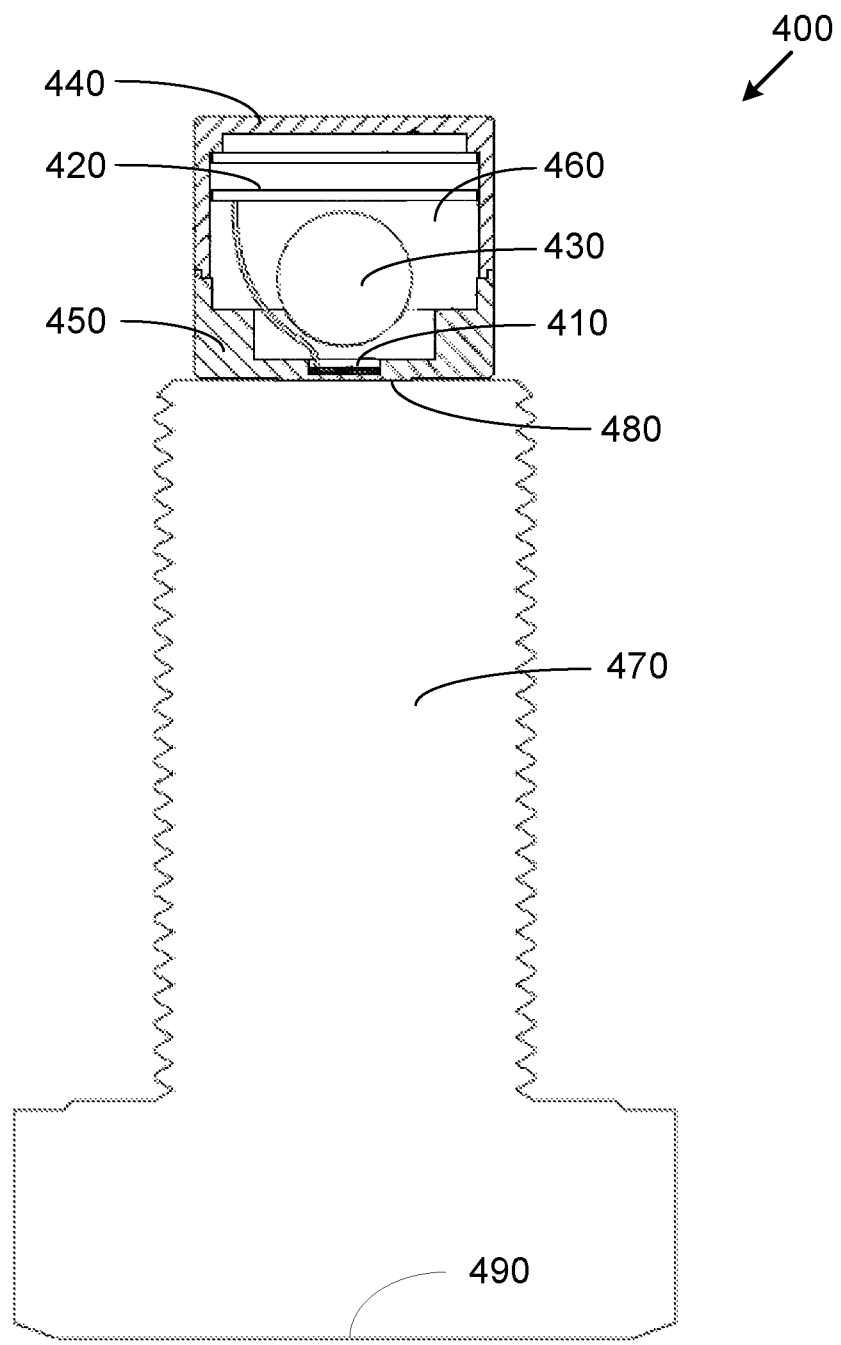
FIG. 4 shows an exemplary diagram of an assembly which contains a system for detecting the health status of a bolt, according to one embodiment of the present invention.

FIG. 4 illustrates an exemplary assembly 400 which has a sensing device 460 for detecting the health status of a bolt 470, according to one embodiment of the present invention. Sensing device 460 is mounted on an end surface 480 of bolt 470. Device 460 includes a piezoelectric plate 410, a circuit board 420, a power module 430, and a housing which comprises an upper part 440 and a bottom part 450. Bottom part 450 is attached to end surface 480. Piezoelectric plate 410 is embedded in bottom part 450 with one side exposed. Plate 410 is connected to circuit board 420. Power module 430 supplies electric power and may comprise a button battery.

The distance between piezoelectric plate 410 and the bottom surface of part 450 should be small. For instance, the distance should be smaller than a quarter of the wavelength of the ultrasonic waves. Such a distance reduces power loss of an ultrasonic signal due to reflection at the bottom surface of part 450.

Circuit board 420 may include circuits for exciting ultrasonic signals, receiving ultrasonic signals, detecting time-of-flight of ultrasonic signals, and performing temperature compensation for group speed measurements. Board 420 may also include a temperature sensor.

As aforementioned, the time of flight of an ultrasonic signal may be used to detect whether a bolt is broken. For instance, in FIG. 4, assume that piezoelectric plate 410 excites an ultrasonic signal. The signal is coupled into bolt 470 through end surface 480 and propagates along the bolt to the other end surface 490. Next, a part of the signal is reflected by end surface 490 and travels back to plate 410. The time of flight of the reflected signal is measured. Since a time delay caused by a crack is much longer than one caused by the strain of the bolt, whether a bolt is broken may be detected.

For better coupling efficiency, couplant may be applied to fill the gaps between plate 410 and bottom part 450 and between bottom part 450 and end surface 480.

The material of top and bottom parts 440 and 450 should be conductive to ultrasound. The material may include metal, ceramic, plastic, or composite material.

Device 460 may be fastened to end surface 480 by bonding, crimping, magnetic attraction, or using threads. Device 460 may also include one or more MEMS sensors to measure motion and orientation data of bolt 470. The MEMS sensors may include one or more accelerometers, magnetic field sensors, or gyroscopes. The motion and orientation data may include information on motion and orientation which is mentioned above.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments. Furthermore, it is intended that the appended claims cover any and all such applications, modifications, and embodiments within the scope of the present invention.

We claim:

1. A method for detecting health status of a bolt, the bolt fastening a rotor blade of a wind turbine, the method comprising:

acquiring first values of axial stress/strain of the bolt and first motion and orientation data of the bolt in different aerial orientations;

calculating first values of prestress and load-stress using the first values of the axial stress/strain and the first motion and orientation data;

comparing the first values of the prestress and load-stress with a reference value of the prestress and a reference value of the load-stress; and determining the health status of the bolt based on results obtained from the comparing step.

2. The method of claim 1, wherein the axial stress equals addition of the prestress and load-stress, the load-stress includes first load-stress caused by gravity of the rotor blade and second load-stress caused by centrifugal force of the rotor blade.

3. The method of claim 2 further comprises acquiring and using, when the wind turbine is in normal working condition, second values of the axial stress/strain and second motion and orientation data of the bolt in different aerial orientations to obtain the reference value of the prestress and load-stress.

4. The method of claim 3, wherein the first and second motion and orientation data include an orientation angle and angular velocity, a value of a first DC component is calculated by using the second values of the axial stress/strain and a low-pass filter or an averaging method, the value of the first DC component is the reference value of the prestress, a value of a second DC component at the orientation angle is calculated by using the second values of the axial stress/strain at the orientation angle and a low-pass filter or the averaging method, the first load-stress at the orientation angle is calculated by deducting the first DC component from the second DC component, a curve of first load-stress versus orientation angle is constructed using first values of the first load-stress at different orientation angles and a curve fitting method, the second load-stress at different orientation angles is calculated by using the second values of the axial stress/strain and deducting the first DC component and the first load-stress at different orientation angles from the axial stress/strain at corresponding orientation angles, a curve of second load-stress versus angular velocity is constructed using first values of the second load-stress at different angular velocity values and a curve fitting means, a value of the load-stress at the orientation angle is calculated by deducting the reference value of the prestress from a corresponding second value of the axial stress/strain.

5. The method of claim 4, wherein a second value of the first load-stress at a detected angle is obtained using the detected angle and the curve of first load-stress versus orientation angle, a second value of the second load-stress at a detected angular velocity is obtained using the detected angular velocity and the curve of second load-stress versus angular velocity, a second value of the prestress of the bolt is calculated by deducting the second value of the first load-stress and the second value of the second load-stress from a third value of the axial stress/strain at the detected angle, whether the bolt is loose or in fatigue is determined by comparing the second value of the prestress with the reference value of the prestress.

6. The method of claim 1, wherein strain of the bolt is obtained using extended length of the bolt, the extended length detected by ultrasonic reflection techniques, a strain gauge, or a fiber-optic method.

7. The method of claim 1 further comprises detecting screwed-out angle of the bolt or a nut pairing with the bolt and determining tightness of the bolt or nut based on the screwed-out angle and detecting whether the bolt is broken by ultrasound.

8. The method of claim 7 further comprises determining whether the bolt is in fatigue based on whether the bolt or nut is loose, whether the bolt is broken, and comparison results between the first values of the prestress and the reference values of the prestress.

9. The method of claim 1 further comprises determining whether the rotor blade is in normal working condition by comparing first values of the load-stress with the reference values of the load-stress.

10. The method of claim 1 further comprises determining health status of a wind turbine system based on health status of the bolt, the rotor blade, one or more additional rotor blades, and one or more additional bolts which fasten the one or more additional rotor blades respectively, the wind turbine system including the bolt, the rotor blade, the one or more additional rotor blades, and the one or more additional bolts.

11. A system for detecting health status of a bolt, the bolt fastening a rotor blade of a wind turbine, the system comprising:

a detection module including a plurality of sensors for acquiring values of axial stress/strain of the bolt and motion and orientation data of the bolt in different aerial orientations;

a stress/strain analysis module for obtaining values of prestress and load-stress of the bolt using the values of the axial stress/strain and the motion and orientation data; and a determination module for determining the health status of the bolt based on comparison results between the values of the prestress and load-stress and reference values of the prestress and load-stress.

* * * * *